United States Patent [19]

Csizmadia

[11] Patent Number: 4,598,923
[45] Date of Patent: Jul. 8, 1986

[54] BICYCLE PORTABLE AS A BAG
[75] Inventor: Lajos Csizmadia, Budapest, Hungary
[73] Assignee: Licencia Talalmanyokat Ertekesito Vallalat, Budapest, Hungary
[21] Appl. No.: 557,157
[22] PCT Filed: Mar. 16, 1983
[86] PCT No.: PCT/HU83/00012
  § 371 Date: Nov. 16, 1983
  § 102(e) Date: Nov. 16, 1983
[87] PCT Pub. No.: WO83/03232
  PCT Pub. Date: Sep. 29, 1983
[30] Foreign Application Priority Data
  Mar. 16, 1982 [HU] Hungary .................. 792/82
[51] Int. Cl.⁴ ............................................ B62K 15/00
[52] U.S. Cl. .................................. 280/287; 280/212; 280/278
[58] Field of Search ............... 280/287, 278, 212, 255, 280/281 R; 180/2.2

[56] References Cited
U.S. PATENT DOCUMENTS 2,696,272 12/1954 Schlaphoff ................. 280/278 X
3,079,172 2/1963 Burwell ..................... 280/278
3,314,494 4/1967 Weitzner ................. 280/287 X
3,444,946 5/1969 Waterbury ................. 180/2.2
4,019,230 4/1977 Pollard ................. 280/255 X
4,111,447 9/1978 Ishida ..................... 280/278

FOREIGN PATENT DOCUMENTS 1064076 5/1954 France ..................... 280/287
2225328 11/1974 France ..................... 280/287
531866 8/1955 Italy ......................... 280/278
2038735 7/1980 United Kingdom ........ 280/287

Primary Examiner—John J. Love
Assistant Examiner—Charles R. Watts
Attorney, Agent, or Firm—Karl F. Ross; Herbert Dubno

[57] ABSTRACT

A portable bicycle has an elongated first part carrying the handlebars and front-wheel fork at its forward end which can fold into the first part and concealed by swinging a second part down from its upright position and a third part forwardly and upwardly. The second part carries the seat and the third part carries the rear wheel. The second and third parts are hinged to the rear end of the first part and the three parts when folded together constitute a case of rectangular parallelopipedal configuration.

6 Claims, 13 Drawing Figures

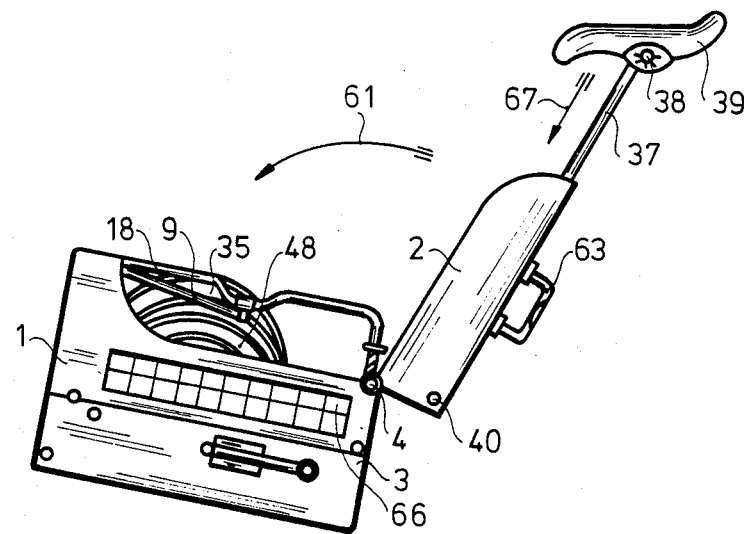
Fig. 5
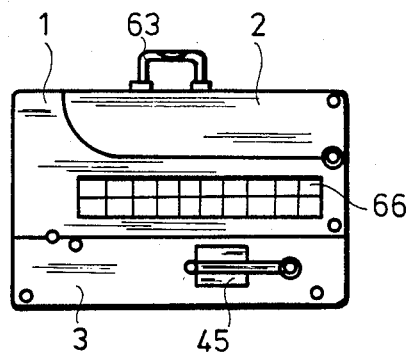
Fig. 6
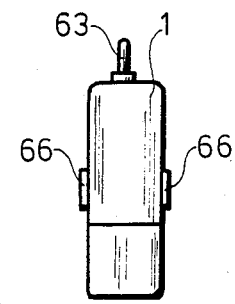
Fig. 6/a

BICYCLE PORTABLE AS A BAG

CROSS REFERENCE TO RELATED APPLICATION

This application is a national phase application corresponding to PCT/HU83/00012 filed 16 Mar. 1983 and based upon a Hungarian national application of 16 Mar. 1982 under the International Convention.

FIELD OF THE INVENTION

My present invention relates to a portable bicycle, that is a two-wheeled, single-track, pedal-operated unit when used, which can be folded up to the size of a handbag, to be carried easily or stored in a small place when out of use.

BACKGROUND OF THE INVENTION

It is increasingly a requirement of bicycles that they should be reliable, meet the requirements of traffic safety and be able to be quickly set up and taken down. Furthermore, they should have small dimensions and small spatial requirements so that they can be stored anywhere, thus for example in an apartment, possible under a piece of furniture or a bed, in the hall, at a desk, beside or under a work-bench in the place of employment without causing injuries to passers-by with their protruding parts, e.g. pedals etc. It should be possible to carry such a portable bicycle by hand, folded-up, in a public vehicle without hindering or injuring anyone or causing an accident; the bicycle must be light so that carrying it will not require great physcial effort; and placing the bicycle in operation should not require special skill.

These requirements are not fully met with any of the bicycles produced so far, as regards their form, weight and design.

The present exterior form and design of the bicycles go back nearly a century, utilizing a frame welded together of thin-walled steel tubes, a fork, a rear wheel driven by pedals through a chain drive and a front freely-rotating wheel which can be steered by a handlebar, a saddle, a brake and auxiliary units.

Depending on the shape of the frame these bicycles may be men's bicycles, where the saddle and the handlebar are connected horizontaly with a tube, or lady's bicycles where no similar horizontal tube is used, or bicycles to be folded up, for both men and women and which, after usage, in order to take up less room can generally be dismantled at one point of the frame or folded up at a hinge by turning one wheel on top of the other. Among these bicylces there are those which have been made lightweight for racing but have geometries and dimensions corresponding to those of ordinary bicycles. A common characteristic of these bicycles is that they require much room, they are heavy, storage is a problem, and they cannot be carried in the form of a bag.

Manufacturers of the known bicycles in circulation and use, strive to eliminate the above-described drawbacks with various measures, including smaller wheel diameters, making the frame and the fork structure of light-metal tube, facilitating the dismounting of the wheels and enabling the turning inward of the pedals. Bicycles are also known, which can be fully dismantled and placed in a rucksack or in a case made especially for carrying or storing.

These solutions make the bicycles suitable for many purposes but do not enable people living in multi-family housing to store them in an appropriate way, e.g. in their apartments, or permit children requiring much exercise to take them along or disassemble and assemble them in a short period, then put them into operation reliably, because the bicycles known so far are so heavy that they cannot be carried up stairs, there may be no store-rooms for bicycles or, if there are, these may be too small. Besides, bicycles may not be stored safely in them. They cannot be taken for excursions in a public vehicle and require much room in other transport means and create problems with transportation; they cannot be taken into offices, etc. because of their great spatial requirements. Hence their use is restricted in most cases.

SUMMARY OF THE INVENTION

The invention eliminates the above drawbacks and provides a bicycle with a shell structure which can be folded up in a hinged form to the size and form of a handbag without disassembly of its frame and structure and then, from the folded state of a portable bicycle having the form of a bag, constituting a compact unit it can be converted to a two-wheeled, single-track, pedal-operated vehicle to be used safely. Setup simple and quick and does not require special knowledge, without the need to hint for the key position or connection of its parts and without assembling it from separate units, and without the risk that its drive chain, cog belt, or other parts of the transmission might become loose, fall off or move into a position unsuitable for operation, because these parts are included in the shell structure.

The elements of the portable bicycle of the invention can be pushed into one another and turned on hinges, then fixed reliably, while the bicycle can be adjusted to the size of the cyclist. To meet the safety requirements it is provided with a hydraulic brake operated by Bowden cable or rod control acting on the rear and front wheel brakes as well as with auxiliary units, such as a headlamp, and a rear stoplight, the latter constitutes, at the same time, the handle for the folded bicycle. The shaft of the driving pedal is formed so that the pedal lever can be turned or sunk into the space formed for this purpose in the shell-structured frame, while the pedal itself can also be turned in. The saddle bar can be pushed into the frame and the hinged lower part of the saddle can be fitted after loosening into the frame. Being turned off, the rear wheel together with the chain sprocket, chain and its bracket-like holder can be turned into the rear part of the frame together with the wheel-covering. The parts of the portable bicycle can be fixed in a folded position so that they cannot get damaged or get caught while carrying.

BRIEF DESCRIPTION OF THE DRAWING

The invention will be described in detail by means of the accompanying drawing in which:

FIG. 5 is a side view of the portable bicycle where the handlebar has been fitted into the front frame part and the saddle bar is pushed into its holder;

FIG. 6 is a side view of the portable bicycle folded up in the form of a suitcase by turning the saddle bracket into the front frame part;

FIG. 6a is a front view of the portable unit of FIG. 6;

SPECIFIC DESCRIPTION

Figure 1:
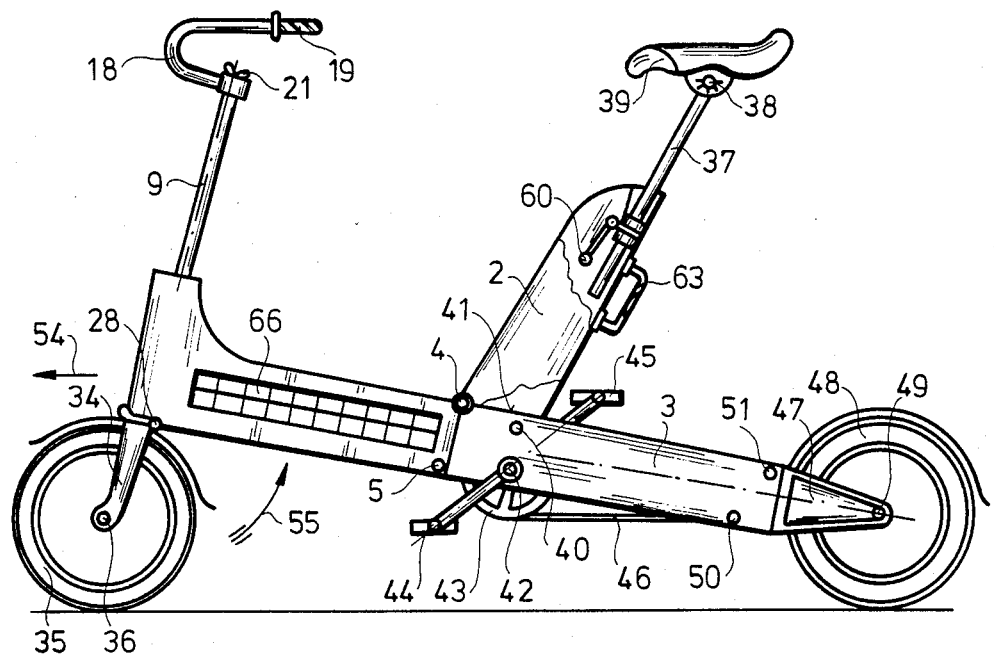
FIG. 1 is a side-view of the portable bicycle in its open state for use.

One of the main units of the portable bicycle is the elongated front frame part or first casing 1 formed as a hollow shell structure which is connected to the saddle support or third elongated casing 2 which pivots thereon via a pin 4 and to a rear frame part or second elongated casing 3 by another pivot pin 5 (FIG. 1). A journal for the steering post 8 on the casing 6 is formed by the lower bearing 10 (FIG. 7) as well as the outer member 11 of the upper bearing 7 in the front of the frame part 1, the bearings being secured by upper and lower retainer rings 12, 13. The lower part of the steering post 8 is held in its adjusted position in the bearing 7 by the nut 14. The upper part 9 of the steering post is provided with a hinged joint 15 which allows for folding of the steering post 8, where its conical end 16 is clamped by the taper nut 17.

Figure 9:
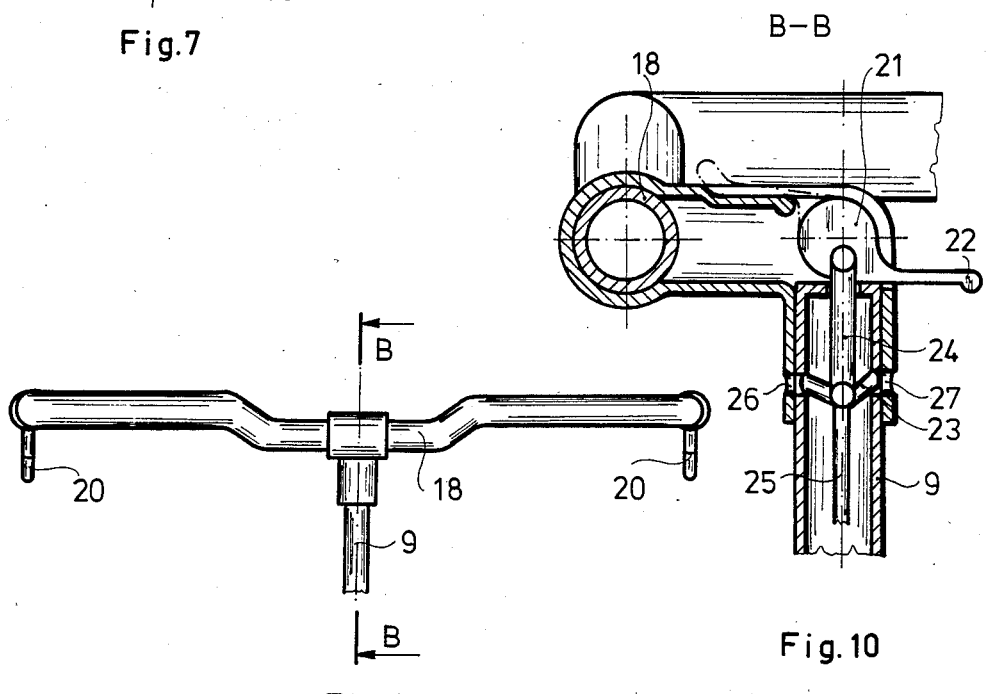
FIG. 9 is a front-view of the handlebar.
Figure 10:
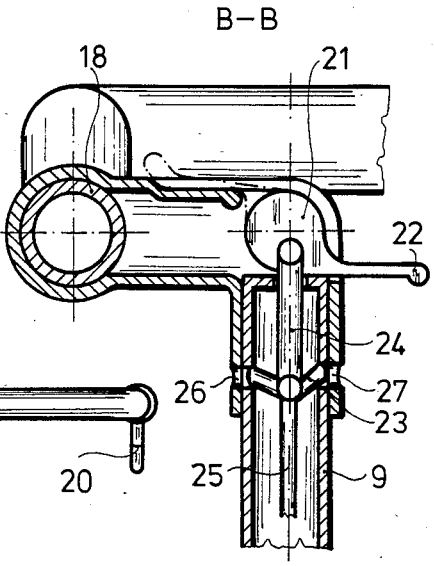
FIG. 10 is a section of the structural details of the connection of the handlebar and steering rod taken along the line B—B in FIG. 9.

The handlebar 18 is on the upper part 9 of the steering post 8, and grips 19 and brake levers 20 are to be found on it (FIG. 9). The upper part 9 of the steering post is fixed to the central part of the handlebar 18 by rotation of the lever 22 of the eccentric 21 (FIG. 10).

Figure 7:
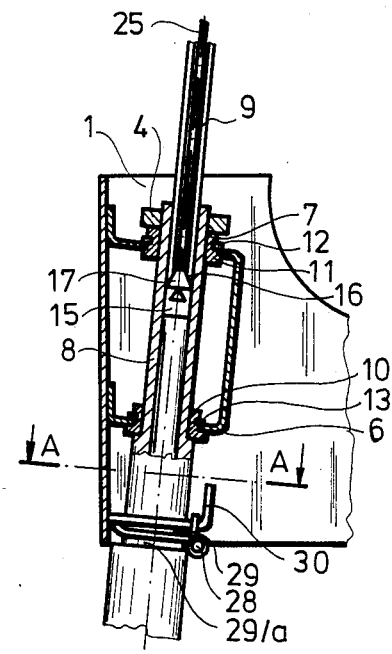
FIG. 7 is an axial section illustrating the structural parts of the handlebar.

The conical pins 23 displaced by the pull rod 29, fitting into the bores 26 and 27, are used to secure against turning off. The eccentric 21 also operates the tapernut joint 17 by pulling the rod 25 (FIGS. 7, 10).

Figure 8:
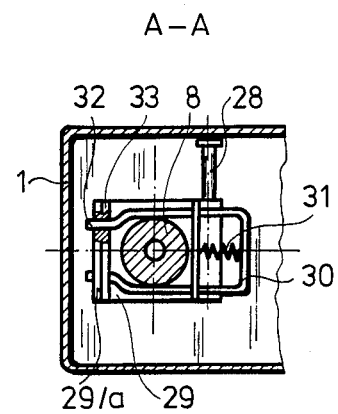
FIG. 8 is a cross section of the handlebar along the line A—A in FIG. 7.

In the lower-part of the steering post 8 a clamping band 29 operated by the pin 28 is arranged. Here the mandrel 32 is pushed into the hole 33 against a spring 31 by the pull-fork 30 (FIG. 8). The clamping band 29a forms a unit with the fork 34, in which the free-running front-wheel 35 is mounted on the shaft 36 (FIG. 1).

Figure 11:
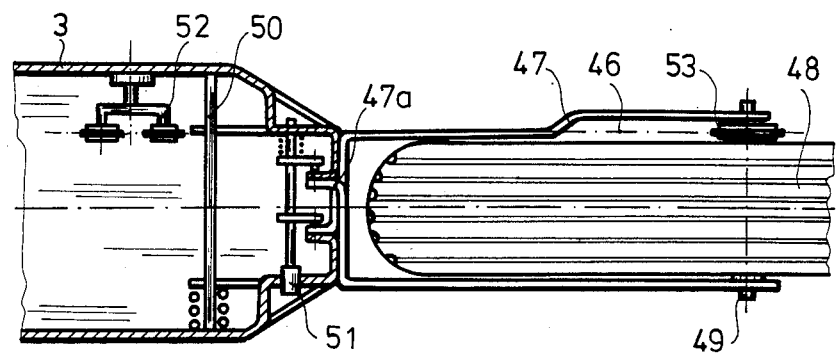
FIG. 11 shows the connection of the rear frame part and the wheel holding bracket, viewed in section from below.

The saddle bar 37, at the end of which there is a saddle 39 to be adjusted by a hinge 38, is supported in a suitable clamp 60 by the saddle bracket (FIG. 5). The saddle bracket is held by spring securing pin 40 (see the construction of spring securing pin 51 in FIG. 11) in its position connected to the rear frame part 3. The driving shaft 42 with the crank 44 and the pedals 45 on its two ends as well as the drive chain sprocket 43 are mounted and supported in bearings in the rear frame part 3. In the rear frame part 3 the bracket 47 holding the rear wheel 48 can be swung about the pivot in 50, and the arm-like extensions 47a of the bracket are connected and kept in position by the snap spring securing bolt 51 (FIG. 11).

The bracket carries the bearings for the rear wheel 48 with its axle 49 and drive chain sprocket 53, which is driven through the chain tensioners 52 by the drive chain 46 in a known manner.

Figure 12:
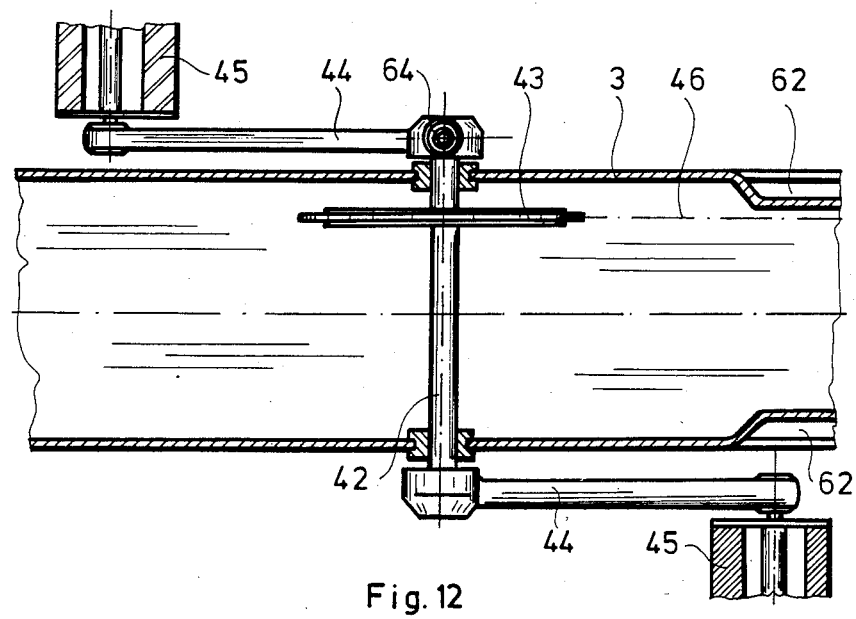
FIG. 12 is a schematic sectional view of the pedal driving unit.

Both cranks 44 in the vicinity of the drive sprocket 43 can be pivoted after releasing the clamp 64 and, by turning the pedals 45 in, they can be placed into the seats 62 (FIGS. 1 and 12) on opposite faces of the shell-like frame part 3. The solar cells 66 arranged at the side of the front frame part serve for charging up the battery.

The portable bicycle whose construction of which has been described in detail operates as follows.

In operating, i.e. open position, it can be used as the generally known bicycles, i.e. the rider sits on the saddle 39, holds the handlebar 19 with both hands, leans slightly forwardly, and pedals in the direction of arrow 54 in FIG. 1.

The bicycle can be stopped by pulling the brake lever 20 or by holding the pedal 45 back and rotating it in a direction opposite to the direction of advancement, by so-called back-pedalling.

The bicycle is folded as follows.

Figure 2:
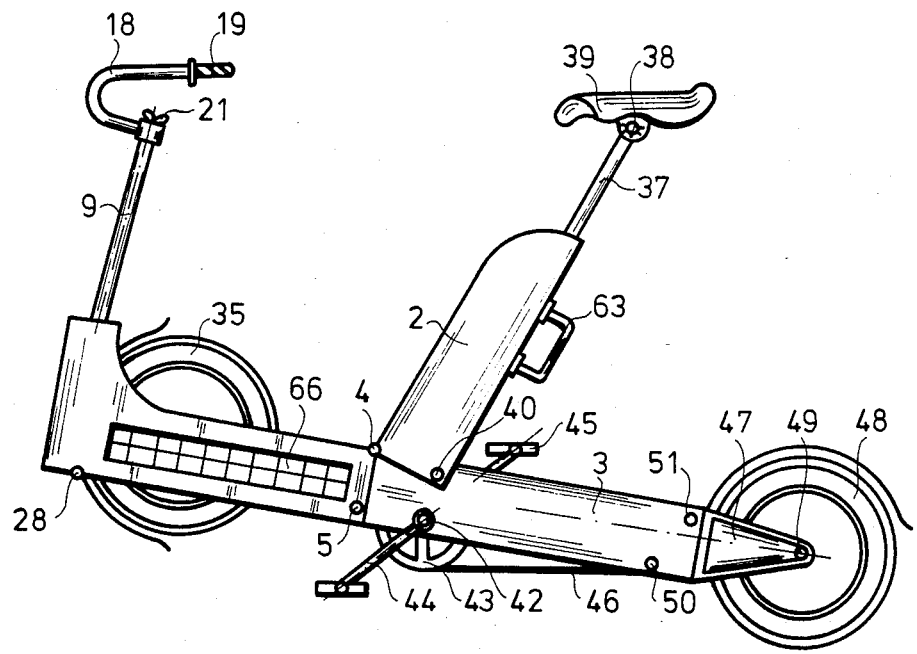
FIG. 2 is a similar side view of the portable bicycle with its front-wheel being tilted into the frame space.

Setting the bicycle into a vertical position by, moving the pull-fork 30 back with one hand, the wheel fork 34 is released and, together with the front wheel 35, is pivoted into the space of the case-like front frame part 1 in the direction of the arrow 55 (FIGS. 1 and 2).

Then the spring securing pins 51 on the rear frame part 3 are released out of the extensions 47a of the bracket 47 so that the bracket 47, together with the wheel 48, axle 49 and driven chain-sprocket 53, can be rotated around the pin 50 into the space of the rear frame part 3 in the direction of the arrow 56 (see especially FIGS. 1 and 11).

Figure 3:
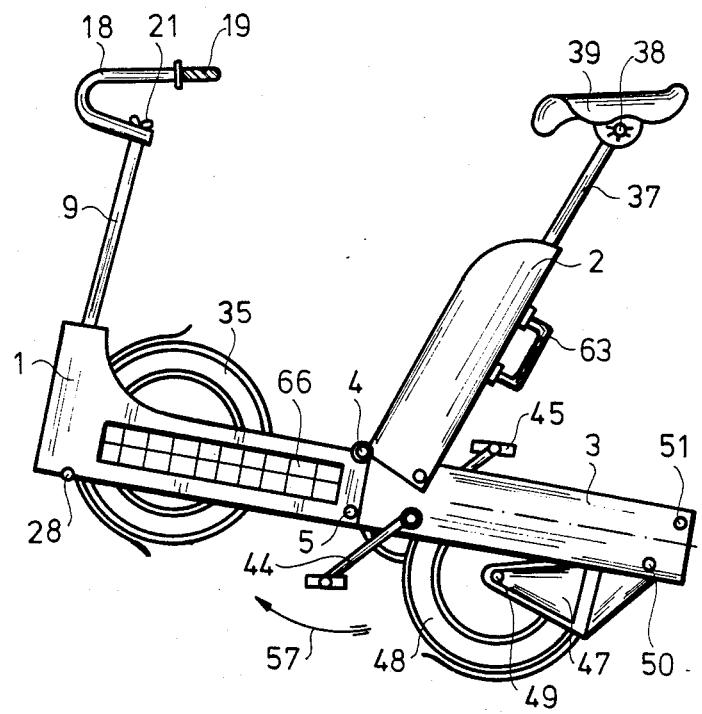
FIG. 3 is another side view of the portable bicycle, with its rear wheel being swivelled into the rear part of the frame.

Next, the spring securing pin 40 is pressed out, i.e. released, and the rear frame part 3 is swung around the pin 5 on the front frame part 1 in the direction of the arrow 57 (FIG. 3).

Figure 4:
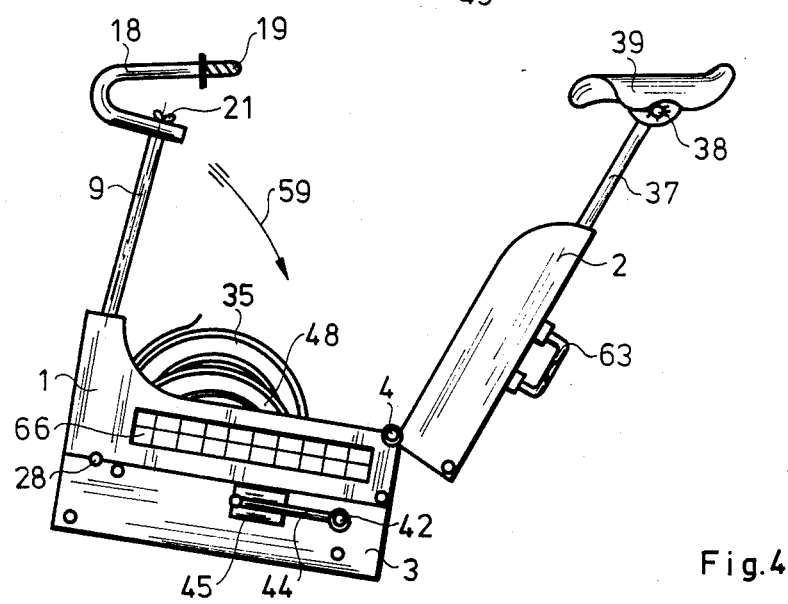
FIG. 4 is a further side view of the rear frame part showing how it is pivotally connected to the front frame part.

Then turning the handle 22 of the eccentric 21 off, the conical pins 23 are taken out of the holes 26 and 27 (FIG. 10), while with the rod 25 the conical joint 17 is also released (FIG. 7). Then the upper part 9 of the steering post is folded at the hinge 15, the handlebar 18 is turned in the direction of the longitudinal axis of the front frame part, then into the front frame part 1 in the direction 59 according to FIG. 4, into the position of a suitcase as seen in FIG. 5.

The following step of the folding up is to tilt the saddle 39 on the hinge 38 and, after the clamp 60 loosened (FIG. 1), to push the saddle bar 37 into the frame of the saddle bracket frame 2 in the direction 67. Then the saddle bracket 2, being turned in the direction 61, is fitted to the front frame part 1 according to FIGS. 5 and 6. The pedals 45 are then turned around and the cranks 44 rotated to fit into the spaces 62 formed in the rear frame part 3. The portable bicycle is thus in the form of a suitcase (FIG. 6). Carrying it is facilitated by a handle 63, which forms in an operating state, a supplementary unit such as a rear light (FIG. 6).

When putting the bicycle into operation, the above operations must be performed in reverse order. The battery of the bicycle can be continuously supplied from the solar cells 66, and it supplies the units,—white light, red light,—with electric energy.

The portable bicycle can be made in the known sizes used by children or in the usual men's, ladies' types used by adults, and the dimensions of the "bag" are determined by the length and width of the front and rear frame parts, arising necessarily when these parts are folded up.

I claim:

1. A portable bicycle which comprises:

an elongated first casing having a front end and a rear end;

a front wheel received in a fork pivotable about a first horizontal pivot axis on said front end whereby said front wheel is receivable in part in said first casing and projects therefrom above and below said first casing in a folded condition of said bicycle;

a steering post with a handlebar mounted in said front end and coupled with said fork for steering same in an erect condition of the bicycle, said steering post being foldable to lie generally along the length of said first casing in said folded condition;

a second elongated casing of substantially equal length as said first casing and having a front end pivotally connected to said rear end of said first casing by an axis disposed near the bottom of said first casing whereby said second casing is swingable into a position below said first casing in said folded condition and receives a portion of said wheel projecting below said first casing;

a pedal assembly mounted close to said front end of said second casing;

a rear wheel assembly mounted on a rear end of said second casing and pivotally connected thereto so as to be swingable to introduce a rear wheel of said rear wheel assembly into said second casing in said folded condition;

means in said second casing coupling said assemblies for rotating said rear wheel upon actuation of said pedal assembly in said erect condition;

a third elongated casing pivotally connected to said rear end of said first casing at an upper point thereon whereby said third casing is swingable from an upright position in said erect condition in which said third casing is supported on said second casing into a position in which said third casing lies along said first casing and receives a portion of said front wheel projecting upwardly from said first casing in said folded condition;

a seat post carrying a saddle mounted on said third casing and extendable therefrom in said erect condition; and at least one spring loaded pin for releasably locking one of said rear wheel assembly and said third casing to said second casing in said erect condition, said casings forming a rectangular housing enclosing said wheels, said steering post, said handlebar and said seat post and saddle in said folded condition.

2. The portable bicycle defined in claim 1 wherein a spring loaded pin is provided to releasably lock said third casing to said second casing in said erect position.

3. The portable bicycle defined in claim 2 wherein a spring loaded pin is provided to releasably lock said rear wheel assembly to said second casing in said erect position.

4. The portable bicycle defined in claim 3 wherein the spring loaded pin comprises a pair of reversely bent fingers engageable in said rear wheel assembly and releasable therefrom upon depression of a pin carrying said fingers.

5. The portable bicycle defined in claim 1 wherein said first casing is provided with an array of solar cells for generating electricity for a light.

6. The portable bicycle defined in claim 1 wherein said third casing has a stop light formed as a handle enabling the portable bicycle to be carried in said folded condition.

* * * * *